United States Patent [19]

Holubka

[11] Patent Number: 4,559,393
[45] Date of Patent: Dec. 17, 1985

[54] CROSSLINKABLE COMPOSITION COMPRISING AMINOEPOXY RESIN - III

[75] Inventor: Joseph W. Holubka, Livonia, Mich.

[73] Assignee: Ford Motor Company, Dearborn, Mich.

[21] Appl. No.: 565,798

[22] Filed: Dec. 27, 1983

[51] Int. Cl.$^4$ ............................................. C08L 63/00
[52] U.S. Cl. .................................... 525/531; 525/528; 525/529; 525/530; 523/414; 523/415; 523/416; 523/417; 528/111; 528/113; 528/114; 528/116; 528/341
[58] Field of Search ............... 525/528, 531, 530, 529; 523/414, 415, 416, 417; 528/111, 113, 114, 116, 341

[56] References Cited

U.S. PATENT DOCUMENTS

| | | | |
|---|---|---|---|
| 2,065,126 | 12/1936 | Echberg | 106/18 |
| 2,731,450 | 1/1956 | Serniuk | 260/80.2 |
| 3,012,984 | 12/1961 | Hudson | 260/31.2 |
| 3,036,041 | 5/1962 | Farbell | 260/47 |
| 3,245,954 | 4/1966 | Bergman | 260/66 |
| 3,373,221 | 3/1968 | May | 260/837 |
| 3,404,018 | 10/1968 | Hicks | 106/252 |
| 3,410,926 | 11/1968 | Hicks | 260/834 |
| 3,478,126 | 11/1969 | Turpin | 260/835 |
| 3,600,290 | 8/1971 | Fitko | 204/159.22 |
| 3,600,459 | 4/1971 | Vasta | 260/834 |
| 3,670,047 | 6/1972 | Broecker | 117/123 D |
| 3,707,526 | 12/1972 | Gannon et al. | 260/47 EA |
| 3,749,758 | 7/1973 | Gannon | 260/835 |
| 3,804,786 | 4/1974 | Sekmakas | 260/18 PT |
| 3,922,253 | 11/1975 | Jerabek et al. | 117/232 |
| 3,947,338 | 3/1976 | Jerabek et al. | 204/181 |
| 3,969,300 | 7/1976 | Nagata et al. | 204/181 |
| 3,996,182 | 12/1976 | Hong et al. | 428/418 |
| 4,018,848 | 4/1977 | Khanna | 260/834 |
| 4,036,795 | 7/1977 | Tominaga | 204/181 |
| 4,036,800 | 7/1977 | Sekmakas et al. | 428/425 |
| 4,037,018 | 7/1977 | McGinniss | 428/418 |
| 4,101,486 | 7/1978 | Bosso et al. | 204/181 C |
| 4,134,865 | 1/1979 | Tominaga | 204/181 C |
| 4,134,866 | 1/1979 | Tominaga et al. | 204/181 C |
| 4,134,932 | 1/1979 | Kempter et al. | 204/181 R |
| 4,145,323 | 3/1979 | Sekmakas et al. | 526/317 |
| 4,147,676 | 4/1979 | Pampouchidis | 528/44 |
| 4,164,486 | 8/1979 | Kudo et al. | 204/159.16 |
| 4,176,099 | 11/1979 | Pampouchidis et al. | 528/49 |
| 4,207,222 | 6/1980 | Blum et al. | 523/416 |
| 4,238,594 | 12/1980 | Pampouchidis | 528/69 |
| 4,246,151 | 1/1981 | Dohy et al. | 523/415 |
| 4,247,659 | 1/1981 | Sekmakas et al. | 206/471 |
| 4,256,621 | 3/1981 | Shimokai et al. | 523/415 |
| 4,274,989 | 6/1981 | Tominaga et al. | 523/415 |
| 4,278,580 | 7/1981 | Schmolzer et al. | 523/415 |
| 4,289,811 | 9/1981 | Shelby, Jr. | 427/239 |
| 4,293,672 | 10/1981 | Jackson | 525/507 |
| 4,294,940 | 10/1981 | Hino et al. | 525/124 |
| 4,296,010 | 10/1981 | Tominaga | 524/591 |
| 4,356,276 | 10/1982 | Honig et al. | 523/404 |
| 4,371,665 | 2/1983 | Hino et al. | 525/109 |

Primary Examiner—Maurice J. Welsh
Assistant Examiner—M. L. Moore
Attorney, Agent, or Firm—Peter D. McDermott; Roger L. May

[57] ABSTRACT

A self-crosslinkable resin and composition of matter comprising same is provided, which resin comprises certain diene functional blocked dieneophile functional aminoepoxy resin, which resin is self-crosslinkable at elevated cure temperature. The diene functional blocked dieneophile functional aminoepoxy resin comprises the reaction product of diepoxide with amine functional diene chain extending reactant, mono-secondary amine functional blocked dieneophile and, optionally, monofunctional end-capping reactant such as mono-secondary amine functional diene and mono-secondary amine functional blocked dienophile. The composition may further comprise crosslinking agent reactive with hydroxy functionality of the resin. The crosslinkable composition of matter is useful in coating and other applications, especially solvent-based primer coating compositions and cathodic electrocoating compositions.

29 Claims, No Drawings

CROSSLINKABLE COMPOSITION COMPRISING AMINOEPOXY RESIN - III

TECHNICAL FIELD

The invention relates to a novel self-crosslinking resin and to a composition of matter comprising same. Specifically, certain diene functional blocked dieneophile functional aminoepoxy resin is self-crosslinking at elevated cure temperatures. According to certain preferred embodiments, this invention relates to use of such resin composition to form corrosion protective coatings. This invention especially relates to one component solvent based primer coating composition comprising such resin and to aqueous coating composition adapted for use in cathodic electrodeposition processes.

RELATED APPLICATIONS

This application is related to concurrently filed applications Ser. No. 566,063 and Ser. No. 566,068. In addition, the following commonly assigned applications each relate to diene/dieneophile chemistry in compositions suitable for thermosetting coatings and the like: Ser. Nos. 455,678 and 455,718 filed Jan. 1, 1983, Ser. Nos. 456,067 and 456,068 filed Jan. 6, 1983 and Ser. No. 458,119 filed Jan. 14, 1983.

BACKGROUND ART

Coating compositions are known which are suitable for application to a substrate, for example, by spraying, dipping electrodeposition or the like, which coating compositions are then cured by baking the coated substrate at an elevated temperature. Typically, such coating compositions comprise resinous materials or blends of resinous materials, in some cases together with suitable crosslinking agent reactive with such resinous materials at elevated temperature.

In regard to electrodeposition of coatings, the process is well described in the art. Typically, an aqueous bath containing the coating composition is placed in contact with an electrically conductive anode and an electrically conductive cathode, and upon the passage of electric current (normally direct current) between the anode and the cathode, an adherent film of the coating composition is deposited. Depending upon the nature of the coating composition, the coating may be deposited at the anode or at the cathode. The voltage applied may vary from as low as, for example, one volt to as high as, for example, 500 volts or higher. Typically, however, the voltage used ranges from about 50 to about 400 volts.

A wide variety of electrodepositable resins are known to the skilled of the art. For example, a number of water-soluble, water-dispersible, or water-emulsifiable poly-carboxylic acid resins can be electrodeposited. Some of these resins include, for example, reaction products or adducts of a drying oil or semidrying oil fatty acid ester with a di-carboxylic acid or anhydride; interpolymeres of a hydroxyalkyl ester of an unsaturated carboxylic acid, unsaturated carboxylic acid, and at least one other ethylenically unsaturated monomer; alkyd-amine vehicles, that is vehicles containing an alkyd resin and an amine-aldehyde resin; and mixed esters of resinous polyols. In U.S. Pat. No. 3,991,028 to Irwin et al, electrodepositable compositions are disclosed which comprise a water-dispersion of a hydrolyzed polyepoxide in combination with an interpolymer of a hydroxyalkyl ester, an unsaturated acid and at least one other monomer, and an amine-aldehyde resin. The use of a hydrolyzed polyepoxide is said to provide improved properties and to avoid agglomeration of the coating composition. In U.S. Pat. No. 4,026,855 to Parekh et al, a coating composition is disclosed to be adaptable for use in electrodeposition or as a water-based coating for application by spray or dip coating methods. The composition comprises an aqueous dispersion of (A) an ungelled modified crosslinking agent comprising certain aminoplast crosslinking agent modified by reaction with a non-resinous compound containing an hydroxyl-group bearing carboxylic acid, and (B) a water-dispersible non-gelled polymeric material carrying a cationic charge and containing at least one class of reactive groups selected from carboxyl groups, alcoholic hydroxy groups and amide groups and also containing amino groups, and (C) an acid solubilizer. In U.S. Pat. No. 4,033,917 to Sekmakas et al, certain copolymers of polyethylenically unsaturated epoxy-amine adducts are disclosed and also stable aqueous dispersions containing same and also the electrodeposition of such aqueous dispersions at the cathode of a unidirectional electrical system. Specifically, amine functional polymers dispersible in water with the aid of a solublizing acid are said to be provided by copolymerizing (A) certain ethylenically unsaturated hydroxy functional amine adduct free of epoxy groups; and (B) copolymerizable monoethylenically unsaturated monomers, a portion of which is amine-functional. The copolymer is said to be stably dispersible in water at certain pH and to be electrodepositable at the cathode, optionally together with an aminoplast curing agent to provide coatings which can be cured, usually by exposure to elevated temperature. U.S. Pat. No. 3,471,388 to Koral is directed to a cathodic electrocoating composition which incorporates an aminoplast crosslinker (e.g., butylated melamine) with an aminated polymer containing hydroxy groups. Numerous suitable hydroxy-containing aminated polymers are suggested which have capability to crosslink with an aminoplast crosslinking agent. One such suggested polymer is the reaction product of a polyfunctional amine with a polyfunctional epoxy compound. The polyhydroxy polymers are said to be disperable in water upon addition of suitable acid such as acetic acid.

Additional teaching directed to coating compositions suitable for use in electrocoating processes is provide in U.S. Pat. No. 4,159,233 to Tinge et al; U.S. Pat. No. 4,057,523 to Blank; U.S. Pat. No. 4,182,831 to Hicks; U.S. Pat. No. 4,192,932 to Dicke, which patent is assigned to the assignee of the present application; U.S. Pat. No. 4,192,929 to Bloomfield, which patent is assigned to the assignee of the present application; U.S. Pat. No. 4,202,746 to Lee et al; and U.S. Pat. No. 4,072,536 to Otsuki et al.

It is a general objective of the present invention to provide a composition of matter adaptable for use in coating compositions, including compositions adapted for use in solvent-based sprayable coating compositions, compositions adapted for use in electrodeposition coating compositions, and compositions adapted for use in the manufacture of adhesives, molding compounds and textile treating resins and the like. Additional objects and aspects of the present invention will be apparent from the following description thereof.

DISCLOSURE OF THE INVENTION

The present invention provides a self-crosslinking resin, specifically, a substantially gel-free diene functional blocked dieneophile functional aminoepoxy resin, preferably of number average molecular weight (Mn) about 1000–9000. Such aminoepoxy resin is the reaction product of suitable diepoxide with reactants comprising chain extending reactants and, optionally, end-capping reactants. Specifically, the chain extending reactants comprise (i) amine functional diene, particularly di-secondary amine functional bis-diene or, more preferably, mono-primary amine functional diene, for example furfuryl amine, or a mixture thereof, and (ii) amine functional blocked dieneophile, particularly di-secondary amine functional bis-blocked dieneophile or, more preferably, mono-primary amine functional blocked dieneophile, for example amino maleamic acid, or a mixture thereof. Suitable end-capping reactants include monofunctional reactants, that is, reactants bearing a single functionality substantially reactive with epoxy functionality of the chain extended resin. The term "monofunctional" in this usage, however, is not intended to be exclusive of diene functionality or dieneophile functionality. Thus suitable end-capping reactants include monofunctional diene reactants, for example mono-secondary amine functional diene reactants and monohydroxy functional diene reactants, and monofunctional blocked dieneophile reactants, for example mono-secondary amine functional blocked dieneophile reactants and monohydroxy functional blocked dieneophile reactants, and any mixture thereof.

The self-crosslinkable resin of the invention is particularly useful in coating compositions and according to preferred embodiments further discussed below is readily adaptable for use in solvent-based coating compositions and in aqueous-basec electrodeposition coating compositions. Coatings provided by the present invention are found to be highly resistant to solvents and humidity and to provide exceptional corrosion protection for the underlying substrate. The invention is particularly advantageous in that it provides coatings which cure at relatively low temperature. The self-crosslinkable resin of the invention also may be used in the manufacture of low pressure laminates, adhesives, molding compounds, textile treating resins and the like.

According to a signficantly advantageous aspect of the invention, the molecular weight of the self-crosslinkable aminoepoxy resin is readily controllable to suit an intended application. Thus, for use in a cathodic electrocoating composition, for example, the aminoepoxy resin is readily provided having preferred number average molecular weight (Mn) of about 1000–9000; for use in solvent-based sprayable coating compositions, such resin is readily provided having preferred number average molecular weight (Mn) of about 1000–4000. Such molecular weight control is achieved by selection of diepoxide reactant having appropriate epoxide equivalent weight and/or by adjusting the molar ratio of diepoxide to chain extension reactants to end-capping reactants. Lower molecular weight resin is provided as such ratio approaches 2:1:1, respectively; higher molecular weight resin is provided as it approaches 1:1:0.

The self-crosslinkable composition of the present invention is particularly suitable for use in solvent-based sprayable primer coating compositions. Such primer compositions can be used, for example, to form heat curable, highly alkali resistant primer coatings on automotive vehicle body panels.

The self-crosslinkable composition of the present invention also can be adapted for use in cathodic electrodeposition. For such use, the aminoepoxy resin is preferably of number average molecular weight (Mn) above about 1000, more preferably about 1000–9000, and is at least partially neutralized with a solubilizing acid, typically an organic acid such as, for example, acetic acid or the like. The at least partially neutralized resin is then dispersed in aqueous solvent. Such coating composition will deposit a heat curable coating at the cathode in an electrodeposition coating process according to techniques well known to the skilled in the art.

Other features and advantages of the present invention will become more apparent from the following detailed description including the preferred embodiments and best mode of the invention.

DETAILED DESCRIPTION OF THE INVENTION

Diepoxide Reactant

Suitable diepoxide reactants include any of a wide variety of diepoxide known to the skilled of the art, for example aliphatic and aromatic diepoxide resins. The diepoxide reactant preferably has epoxide equivalent weight of about 150–2000. In general, the epoxide equivalent weight is selected to suite the intended use of the final composition. Thus, for sprayable solvent-based coating compositions a lower composition viscosity is desirable. For such use it is generally preferable to employ diepoxide having epoxide equivalent weight of about 150–1000. In comparison, for example, cathodic electrodeposition compositions of the invention preferably have higher viscosity and for such use diepoxides having epoxide equivalent weight of about 150–2000 are generally preferred.

The diepoxide is preferably free of carboxy ester moieties linking the epoxide groups, since such carboxy ester-free diepoxides have been found to provide cured coatings according to the invention which are significantly more alkali resistant and provide significantly enhanced corrosion protection to the underlying substrate.

One class of suitable diepoxides includes the Bisphenol A-epichlorohydrin resins. These are commercially available as, for example, Epon 828, 1001 or 1004 (trademarks) marketed by Shell Chemical Company, Houston, Texas, U.S.A. Suitable diepoxides may contain aromatic groups, such as benzene nuclei, at a preferred average of at least about one, more preferably at least about two, for each terminal epoxy group. Especially suitable are Bisphenol A epichlorohydrin resins comprising up to 10 or more bis-phenol moieties within the epichlorohydrin reaction product backbone, for example those of number average molecular weight up to about 8000, preferably 300–4000.

Aliphatic diepoxides, particularly lower molecular weight aliphatic diepoxides, including cycloaliphatic diepoxides are used preferably in conjunction with aromatic diepoxides to modify coating properties. Certain lower molecular weight aliphatic diepoxides used alone may produce coatings which are relatively more humidity sensitive. Suitable aliphatic diepoxides include, for example, the reaction product of epihalohydrin with aliphatic diols such as glycol, epoxidized polybutadienes, vinylcyclohexenedioxide and dipentene dioxide.

Still further, hydrogenated Bisphenol A-epichlorohydrin products may also be employed.

Numerous additional suitable diepoxides are commercially available or readily prepared using well known techniques and commercially available starting materials, and these will be apparent to the skilled of the art in view of the present disclosure. Compatible mixtures of any of these compound also are suitable.

Amine Functional Diene Chain Extending Reactant

Amine functional dienes suitable for the present invention are those comprising conjugated double bonds, particularly, those suitable for Diels Alder cycloaddition reaction at elevated temperature with enefunctionality or with other dieneophile functionality. Suitable amine functional dienes include many well known to the skilled of the art. Preferred are monoprimary amine functional dienes, preferably of molecular weight about 70-300 and preferably comprising no functionality substantially reactive with the diepoxide, other than the N-hydrogens. Exemplary monoprimary amine functional dienes include furfuryl amine, 2-aminomethyl-1,3-butadiene, and the like and a mixture thereof. Suitable di-secondary amine functional bis-dienes will be apparent to the skilled of the art in view of the present disclosure and can be prepared readily using well known techniques and commercially available reactants.

The amine functional diene preferably is mono-primary amine functional diene according to formmula I:

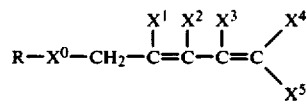

wherein:

R is a monoprimary amine functional hydrocarbon moiety, which preferably comprises no functionality substantially reactive with the diepoxide reactant other than the amine functionality; and

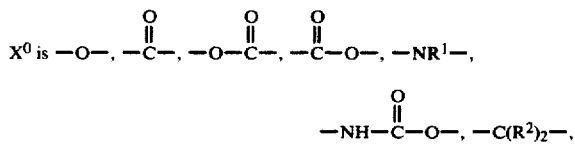

or the like, wherein $R^1$ is hydrogen, straight, branched or cyclo alkyl, aryl, arylalkyl or the like, and each $R^2$ is the same or different and is selected from hydrogen, hydroxy, carboxy, straight, branched or cycloalkyl, aryl, arylalkyl, and the like, each alkyl, aryl or arylalkyl moiety of $R^1$ and $R^2$ being unsubstituted or mono or poly-hydroxy substituted or mono or poly-amino substituted; and $X^1$, $X^2$, $X^3$, $X^4$ and $X^5$ are the same or different and each is hydrogen, hydroxy, carboxy, amino, straight, branched or cyclo alkyl, aryl, arylakyl, cyano, nitro, or the like, or $X^1$ and $X^5$ together are alkylene, —O—, —$NR^1$— wherein $R^1$ is as defined above, or like divalent group (resulting in a cyclic diene moiety), each alkyl, aryl, arylalkyl and alkylene moiety of $X^1$, $X^2$, $X^3$, $X^4$ and $X^5$ being unsubstituted or mono- or poly-hydroxy substituted or mono- or polycarboxy substituted or monoor poly-amino substituted.

According to one most preferred embodiment, the monoprimary amine functional diene reactant is of the general formula:

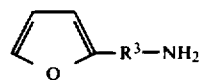

wherein $R^3$ is a divalent organic linking moiety containing no ester groups and no functionality substantially reactive with the diepoxide or with the endcapping reactant, if used.

The reaction product, that is, the aminoepoxy resin, comprises, on average, at least one diene moiety per molecule. Each diene moiety will be available for reaction with a dieneophile moiety of the resin during heat curing of a composition according to the invention. More preferably, the aminoepoxy resin provides, on average about two or more, such as about 2–10 diene moieties per molecule.

Amine Functional Blocked Dieneophile Reactant

The aminoepoxy resin of the invention preferably comprises, on average, at least about 1, preferably about 2-10, blocked dieneophile groups per molecule. The blocked dieneophile groups are capable of reacting with the diene moieties of the aminoepoxy resin upon curing the composition at elevated temperature, typically about 100° C.–200° C. Preferably the dieneophile moiety is an ene moiety although other suitable dieneophile moieties will be apparent to the skilled of the art in view of the present disclosure.

According to a preferred embodiment of the invention, the amine functional blocked dieneophile comprises monoprimary amine functional blocked dieneophile reactant. The mono-primary amine functional blocked dieneophile reactant is preferably the reaction product of maleic anhydride, unsaturated lactone, or a compatible mixture thereof with a suitably reactive diene, and a suitably reactive diamine. The diene reactant acts as a reversible blocking agent for the dieneophile functionality and such reaction can be carried out prior to, during or after the reaction with the diamine. The diene reactant preferably has a boiling point at or below the cure temperature of the coating composition such that it will be driven from the coating composition during cure thereof, and not compete with the diene functionality of the aminoepoxy resin for reaction with the dieneophile functionality. To maximize yield of mono-primary amine functional blocked dieneophile, it is preferred to add the anhydride or lactone reactant slowly to an excess of diamine reactant.

According to one prefered embodiment, the mono-primary amine functional blocked dieneophile reactant comprises amino maleamic acid, specifically, the reaction product of suitable diamine with 3,6-endoxo-1,2,3,6-tetrahydrophthalic anhydride. The named anhydride is commercially available, for example from Aldrich Chemical Co., Milwaukee, Wisconsin, U.S.A. and also can be prepared as the reaction product of furan with maleic anhydride.

More generally, suitable amine functional blocked dieneophile reactant comprises the reaction product of (i) suitable diamine, and (ii) suitable conjugated diene blocking agent, with (iii) one reactant selected from the group consisting of maleic anhydride, suitable unsaturated lactones or the like or any compatible mixture thereof, wherein the lactone preferably is selected from those of the general formula:

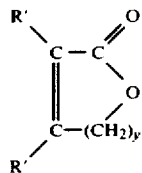

wherein each R' is selected independently from H, $C_1$-$H_5$ alkyl, $C_1$-$C_5$ hydroxy alkyl and the like, and y is preferably about 1-4. Numerous suitable diamines are commercially available and will be apparent to the skilled of the art in view of the present disclosure. Suitable diamines include those of the general formula $H_2N$—$R^5$—$NH_2$ wherein $R^5$ is any divalent organic linking moiety of at least two carbons, preferably 2-15 carbons, which is substantially unreactive with diepoxide, the ene reactant, the diene blocking agent, and the end-capping agent (if employed). Included are branched, straight and cyclic aliphatic diamines, aromatic diamines and arylaliphatic diamines. Exemplary diamines include isophorone diamine which is preferred in view of the difference in reactivity of the two amine groups resulting in higher yield of the desired product, 1,4-butanediamine, 1,5-pentanediamine, 1,6-hexanediamine, and a compatible mixture of any of them. Other preferred diamines include those of molecular weight about 80-300 which comprises no substantially reactive functionality other than amine. Exemplary such diamines include 1,2-ethylenediamine, 1,3-propanediamine, the isomers of toluene diamine and the like and a compatible mixture of any of them.

Suitable conjugated diene blocking agents include numerous commercially available dienes readily apparent to the skilled of the art in view of the present disclosure. Included are any sufficiently reactive conjugated aliphatic, cyclic aliphatic, and heterocyclic dienes which will liberate or de-block from the dieneophile moiety at the cure temperature of the coating composition. The diene blocking agent should be substantially unreactive with the other reactants except for the dieneophile functionality of the ene reactant. Exemplary conjugated diene blocking agents include furan which is preferred since it de-blocks at approximately 120° C., conjugated cycloalkadiene such as 1,3-cyclopentadiene and 1,3-cyclohexadiene, conjugated alkadiene preferably of about 4-10 carbons, for example, 1,3-butadiene, 2-methyl-1,3-butadiene, and the like and a compatible mixture of any of them. The reactions described above for preparation of the amine functional blocked dieneophile crosslinking agent can be conducted according to methods well known to the skilled of the art. It should be noted that where symetrical diamine is employed, such as 1,6-hexanediamine, rather than diamine wherein one amino group is substantially more reactive than the other, such as isophorone diamine, there can be a portion of the diamine reactant in which both amine groups remain unreacted due to reaction of both amine groups of another portion of the diamine reactant. To prevent subsequent unwanted amine reactions and gelling, substantially all unreacted diamine should be removed from the reaction product. Removal of diamine can be done by methods known to the skilled of the art, for example by thorough rinsing of the reaction product with dimethoxy ethane or other suitable solvent.

End-Capping Reactant

The aminoepoxy resin of the invention preferably is end-capped by reaction with suitable monofunctional reactant. Preferred are monofunctional diene reactants and monofunctional blocked dieneophile reactants, of molecular weight about 70-300, included among which are many well known to the skilled of the art. Exemplary such end-capping reactants include mono-secondary amine functional diene, monohydroxy functional diene, mono-secondary amine functional blocked dieneophile, mono-hydroxy functional blocked dieneophile, and any mixture thereof. As noted above, the term monofunctional in this usage is intended to mean a single functionality substantially reactive with epoxy functionality and is not exclusive of diene or dieneophile functionality. Especially where the aminoepoxy resin is already both diene and blocked dieneophile functional, the mono-secondary amine functional end-capping reactants generally are preferred over mono-hydroxy functional reactants in view of the milder reaction conditions required for amine-epoxy reaction. Preferably no more than about 10-20% of the total epoxide functionality is reacted with end-capping reactant. As noted above, however, the molar ratio of reactants can be varied to provide aminoepoxy resin of desired molecular weight. The chain extended diepoxide reactant is reacted with the end-capping agent, if any, according to methods well known to the skilled in the art. Accordingly, for example, the chain extended diepoxide is mixed with the end-capping agent and the mixture is heated to reaction temperature, typically above 60°-80° C., until substantially all epoxide functionality has reacted.

Suitable monofunctional diene end-capping agents include those of formula I:

$$R-X^0-CH_2-\underset{\underset{X^1}{|}}{C}=\underset{\underset{X^2}{|}}{C}-\underset{\underset{X^3}{|}}{C}=C\underset{X^5}{\overset{X^4}{\diagup}}$$

wherein:

R is a monohydroxy functional hydrocarbon moiety or a mono-secondary amine functional hydrocarbon moiety, respectively, which comprises no functionality substantially reactive with the chain extended diepoxide reactant other than the hydroxy or secondary amine functionality; and

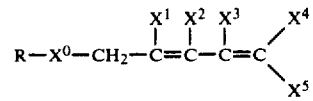

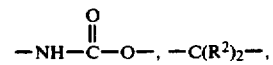

or the like, wherein $R^1$ is hydrogen, straight, branched or cyclo alkyl, aryl, arylalkyl or the like, and each $R^2$ is the same or different and is selected from hydrogen, straight, branched or cycloalkyl, aryl, arylalkyl, and the like, each alkyl, aryl or arylalkyl moiety of $R^1$ and $R^2$ being unsubstituted; and $X^1$, $X^2$, $X^3$, $X^4$ and $X^5$ are the same or different and each is hydrogen, straight, branched or cyclo alkyl, aryl, arylakyl, or the like, or $X^1$ and $X^5$ together are alkylene, —O—, —NR¹— wherein $R^1$ is as defined above, or like divalent group (resulting in a cyclic diene moiety). Exemplary monohydroxy dienes include furfuryl alcohol and 2-hydroxymethyl-1,3-butadiene and the like and any compatible mixture thereof.

Preferred monofunctional blocked dieneophile endcapping reactants include the reaction product of a suitable diene blocking agent, as described above, such as furan, cyclopentadiene, and the like, with monohydroxy functional or mono-secondary amine functional dieneophile such as, for example, hydroxypropyl methacrylate, methylol maleimide or the like or a compatible mixture thereof. Again, since such monofunctional endcapping reactant provides only end-capping and not chain-extending reaction with the diepoxide, self-crosslinking aminoepoxy resin of lower molecular weight can be provided according to this embodiment. Such lower molecular weight resin is particularly advantageous for use in sprayable solvent-based coating compositions.

The amine functional blocked dieneophile and the amine functional diene reactants can be reacted simultaneously with the diepoxide, but preferably are reacted sequentially. If reacted simultaneously, it will be within the skill of the art to select suitable molar ratios, in view of the relative reactivity of the reactants, to achieve the desired degree of diene and blocked dieneophile functionality in the product aminoepoxy resin. It is generally preferred to react sequentially, since this is found to provide a resin product of narrower molecular weight range. It is generally preferred that the diene functionality and the blocked-dieneophile functionality of the self-crosslinking aminoepoxy resin of the invention be present in a ratio of approximately 1:2 to 2:1, respectively, and most preferably such ratio is about 1:1. The end-capping reactant(s) can be employed either simultaneously with or, more preferably, subsequently to the chain-extension reactants. If reacted simultaneously, it will be within the skill of the art to select suitable reactant ratios, in view of their relative reactivities, to produce an aminoepoxy resin product having the desired number average molecular weight and having the desired degree of functionality.

Crosslinking Agent

Although the resin of the invention is self-crosslinking, additional crosslinking agent may be employed. The diene functional blocked dieneophile functional aminoepoxy resin provides free hydroxy groups as a result of the amine/epoxy reactions. Therefore, according to one embodiment of the invention the crosslinkable composition further comprises suitable crosslinking agent reactive with such hydroxy groups. Numerous such crosslinking agents are well known to the skilled of the art and include, for example, any of a variety of aminoplast crosslinking agents, for example, partially alkylated melamines (melamines formaldehyde resins modified by alcohols, for example, partially methylated melamines and butylated melamines, polyalkyl ethers of the polymethylol melamines, for example, hexamethoxy methylmelamine; urea formaldehyde condensate modified by alcohol, for example, paraformaldehyde and trioxane; polymethylol compounds of hexamethylene diurea; polycarboxylic acid such as adipic acid and the dimethylol amide and methylol ether thereof; tetramethylolhydrazodicarbonamide; polymethylol compounds of polycaprolactam and methylol ethers thereof; and the like and a compatible mixture of any of them. Butylated melamines are preferred since they are readily commercially available and provide suitable crosslinking reactivity with the aminoepoxy resin of the invention.

Also suitable are blocked polyisocyanate crosslinking agents. As used herein "blocked polyisocyanate" means an isocyanate compound containing two or more isocyanato groups, each of which has been reacted with a blocking agent which will prevent reaction of the isocyanate group at room temperature with compounds that conventionally react with such groups, and at least some of which will permit that reaction to occur at higher (cure) temperatures. In general, the blocked polyisocyanate may be prepared by reacting a sufficient quantity of an active hydrogen containing blocking agent with the polyisocyanate to insure that substantially no free isocyanato groups are present.

The proper proportion of blocked polyisocyanate crosslinking agent to aminoepoxy resin will depend, in part, upon the degree of hydroxy functionality of such resin, the properties desired in the coating to be produced and, in part, upon the desired cure response of the coating composition (which will depend, in turn, upon the baking schedule to be used in curing the coating composition) and, in part, upon the desired storage stability of the composition, that is, upon the desired shelf life. Accordingly, the amounts of such crosslinker that can be used varies considerably. However, it will be within the skill of the art in view of the present disclosure to provide blocked polyisocyanate crosslinking agent in suitable amounts. Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples include the aliphatic compounds such as trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; subsituted aromatic compounds such as dianisidine diisocyanate, 4,4'-diphenylether diisocyanate and chlorodiphenylene diisocyanate; the triisocyanates such as triphenyl methane-4,4'4''-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; tri-methylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

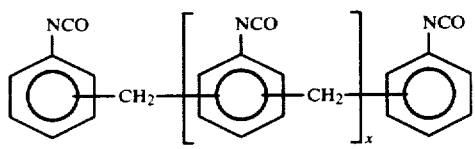

wherein x equals 1 to 3. The compounds, sold under the tradename "PAPI" by the Upjohn Chemical Company of Kalamazoo, Michigan, are particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Preferred blocking agents include, for example, those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are ε-caprolactam, γ-butyrolactam and pyrrolidone, while suitable triazoles include compounds such as 1,2,4-triazole, 1,2,3-benzotriazole, 1,2,3-tolyl triazole nd 4,5-diphenyl-1,2,3-triazole. Particularly preferred active hydrogen containing blocking agents are methylethyl ketoxime and 2-ethylhexanol.

(i) Isocyanurate Ring Containing Blocked Isocyanate Compounds

Within the scope of the above general class of blocked polyisocyanate crosslinking agents, a particular class or type of blocked polyisocyanate crosslinking agent which may be employed in the coating compositions of the invention comprises isocyanurate ring containing blocked isocyanate compounds. In general, these blocked polyisocyanates may be formed by blocking with the aforementioned blocking agents. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particularly desirable blocked polyisocyanate crosslinking agent is the blocked form of the pure trifunctional isocyanurate represented by the following formula:

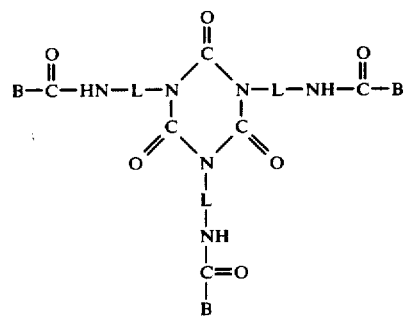

wherein each L is selected independently from the group consisting of aliphatic, cycloaliphatic and aromatic groups and combinations thereof and B is the residue of an active hydrogen containing blocking agent. More specifically, this compound is disclosed in U.S. patent application Ser. No. 368,178 filed Apr. 14, 1982, the disclosure of which is hereby incorporated by reference.

(ii) Oligoester Modified Blocked Polyisocyanates

Still further particular blocked polyisocyanates useful as crosslinking agents in the coating compositions of this invention are oligoester modified blocked polyisocyanates prepared from a particular class of oligoester diols and triols. A first type of such oligoester modified blocked polyisocyanate is prepared from organic diisocyanates wherein one isocyanate group is more reactive than the other, with the more reactive isocyanato first being blocked with a blocking agent and the remaining isocyanato group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanato terminated prepolymer followed by blocking of the terminal isocyanato groups of the prepolymer with an active hydrogen containing blocking agent.

Each of these materials is particularly useful in the compositions of the invention and produces final cured coating compositions exhibiting good flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight (Mn) between about 150 and about 3000, preferably between about 230 and about 1000, (ii) bear 2 or 3 hydroxyl groups per molecular, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxy groups, and monoepoxide;

(b) the esterification reaction product of polyepoxide, i.e., a compound having 2 or more epoxide groups, and monocarboxylic acid, preferably containing no ethylenic unsaturation, and bearing no hydroxy functionality;

(c) the esterification reaction product of hydroxy functional carboxylic acid and monoor polyepoxide, preferably monoepoxide;

(d) the esterification reaction product of mono-carboxylic acid and hydroxy functional mono- or polyepoxide, preferably monoepoxide; and (e) mixtures of (a)–(d).

As noted above, the first type of oligoester modified blocked polyisocyanate crosslinking agent is prepared by (i) reacting organic diisocyanate bearing one isocyanato group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate cross-linking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic and the diisocyanate and the blocking agent are preferably admixed at temperatures no higher than about 80°, preferably below about 50° C. to minimize the exothermic effect.

The diisocyanate/blocking agent intermediate is next reacted with the oligoester diol or triol described above so as to react substantially all free or unblocked isocyanato groups of the intermediate with hydroxyl groups of the oligoester. This reaction is carried out desirably at a temperature of about 80°–120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanato groups formed on the resultant prepolymer with an active hydrogen containing blocking agent as described above so as to react with substantially all the isocyanato groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanato group be more reactive than the other, the preparation of this type of crosslinking agent does not preclude the use of such material.

Other suitable crosslinking agents will be apparent to the skilled of the art in view of the present disclosure.

In the crosslinkable compositions of the invention, if an aminoplast or blocked polyisocyanate crosslinking agent is employed, it may be advantageous in certain embodiments or for certain applications to include in the composition any of a variety of compatible catalysts known to the skilled of the art to catalyze reaction of same with hydroxy, for example, for aminoplast crosslinking agent, paratoluenesulfonic acid, phosphoric acid, phenol acid phosphate, butyl maleate and the like or a compatible mixture of any of them. Exemplary catalysts for blocked polyisocyanate crosslinking agent include the Lewis acid catalysts and others known to the skilled of the art. In addition, a flow control agent, for example, polybutylacrylate; a wetting agent, for example, silicone; pigments; a pigment dispersent; and/or a corrosion inhibitor, for example, chromate pigment, several of all of which are known to the skilled of the art, may be employed in the coating compositions of the invention.

Di- and polyhydroxy compounds of diverse character may be employed also in the composition of the invention to modify the properties of the composition (i.e. the properties prior to or following cure) as well as to act as solvent, including reactive solvent, for solubilizing the crosslinking composition. Thus, for example, these compounds may impart increased flexibility or reduce cratering in spray-applied cured films of the crosslinking composition of the invention. Exemplary hydroxy compounds include ethylene glycol, dipropylene glycol, 1,6-hexanediol, and polycaprolactone diols. Another class of glycols includes hydroxy terminated polybutadienes, hydrogenated bis-phenol-A, such hydroxy compounds being of generally hydrophobic character and molecular weights of about preferably 100–5000, number average. Higher boiling solvents (e.g. boiling point above about 180° C. as 190°–250°) that are of polar character may tend to interact with the resinous components of crosslinking composition and thereby allow higher solids content. If such hydroxy functional compounds are included in the composition of the invention, then crosslinking agent reactive with hydroxy functionality, such as described above, may be advantageously employed.

As noted above, pigments may be used in the composition of the invention in accordance with known techniques. Pigments are employed most typically, for example, to enhance the efficacy of compositions employed as coating compositions over corrosion susceptible substrates. Chromate pigments, in particular, have been used to enhance corrosion protection. It is, however, a significant advantage of the present invention that chromate pigments need not be employed in compositions employed as such coating compositions over corrosion susceptible substrates. Cured coating of the invention are highly alkali resistant and provide excellent corrosion protection even without chromate pigments. Such pigments and others can be employed, however, and may be desirable for aesthetic purpose. Exemplary pigments include titanium dioxide, silica, carbon black, and barytes and are employed typically at pigment:binder weight ratios of about 40:60 to about 60:40.

It is one characterizing aspect of the present invention that the substituent groups on the diene functionality and on the dieneophile functionality of the aminoepoxy resin employed in the compositions of the invention can be selected to provide the desired degree of reactivity, that is, cure response. In particular, the degree of reactivity is increased by diene moiety substitution groups which, in net effort, are electron donating, that is, which decrease the electron affinity of the diene functionality conjugated double bond. Thus, reactivity is increased by substituent groups such as, for example, amine and ether linkages, sulfoxide, sulfone, urethane and the like. Similarly, it will be understood by the skilled of the art in view of the present disclosure, that the shelf stability of the composition is enhanced by ene moiety substitution groups which, in net effect, are electron withdrawing, that is, which increase the electron affinity of the ene functionality double bond. Thus, for example, shelf life is increased by electron withdrawing diene substitution groups such as nitro, cyano, ester (i.e.,

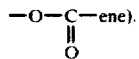

nitrile, carbonyl, straight, branched or cyclo alkyl or cyclo alkyl or alkylene, arylene, aralkylene, —O—, —NR—, —S and the like.

It will be within the ability of those skilled in the art, in view of the present disclosure, to select diene substituent groups which provide, in net effect, the desired compromise between shelf stability and reactivity. It generally is preferred that no electron withdrawing group(s) be substituted directly on any carbon of either diene functionality double bond, nor on any adjacent or next adjacent atom. In certain applications, however, a composition of the invention may require extended shelf life or for some other reason call for or tolerate diene functionality comprising electron withdrawing substitution groups on the diene moiety.

APPLICATIONS

As noted above, the self-crosslinking resin of the invention is useful in a variety of applications including, especially, in coating compositions to provide an aesthetic and/or protective film on a substrate. In particular, such crosslinkable compositions of the invention can be formulated into a variety of primer formulations including both aqueous primer formulations and non-aqueous primer formulations. Such primers can be used as coatings for bare or treated steels (e.g., conversion coated with phosphates) as well as for guide coats over primers which were previously deposited, for example, by electrodeposition. Conventional modifying ingredients can be used in such primer formulations including, for example, flow control agents, pigments, pigment dispersents, thixotropes, anti-cratering aids, photostabilizers and the like, as indicated above.

SOLVENT BASED PRIMERS

Compositions of the invention can be dispersed in organic solvent and applied to a substrate, for example a ferrous metal substrate, according to well known techniques such as by spray, curtain, dip and other coating application methods. For solvent based coatings to be applied by spray application methods, the aminoepoxy resin preferably has number average molecular weight about 1000-3000. It will be within the ability of those skilled in the art to determine a suitable solvent and amount of same for a given coating composition of the invention, for a given application. It will be understood that any solvent allowed to remain in the cured coating should be inert to avoid adverse effects upon the cured coating or upon another coating used in conjunction with it, during the curing process or thereafter. Preferably the cured coating is substantially free of solvent. Sufficient solvent is used to reduce the viscosity of the coating composition to a level suitable for application to the substrate in the desired manner. Thus, for example, for a composition to be used as a spray-applied primer coating composition, it is preferred that sufficient solvent be used to reduce the viscosity of the coating composition to about 25-35 seconds, No. 4 Ford Cup at 27° C. (80° F.).

Solvent based coating compositions according to the invention are cured by heating same to a sufficient temperature for a sufficient time to drive off the solvent, to de-block the dieneophile functionality, and to cause reaction of the diene functionality with the de-blocked dieneophile functionality. Thus, for example, a solvent based coating composition comprising the cross-linkable composition of the invention according to preferred embodiments described above, applied by spray techniques to the surface of an automotive vehicle body panel as a primer coat would be cured by heating to a temperature above about 130° C. more preferably about 135°-180° C. for approximately 15-30 minutes.

WATER BASED COATING COMPOSITIONS

The self-crosslinkable composition of the present invention can be formulated into water based coating compositions. Accordingly, the aminoepoxy resin is at least partially neutralized by acid, preferably weak organic acid such as formic acid, acetic acid, which is generally preferred, latic acid, butryric acid or the like or a compatible mixture of any of them. Additional suitable neutralizing acids (often referred to as "solubilizing acid") are known to the skilled of the art and will be apparent in view of the present disclosure. The at least partially neutralized resin is dispersed into water, preferably de-ionized water for use either in spray application methods, flow coating, etc. or electrodeposition methods. Cured coatings resulting from such methods are found to provide exceptionally good flow characteristics resulting in smooth and otherwise asesthetically superior films having exceptionally good solvent and humidity resistance. The cured coatings were also found to be highly alkali resistant and thus, to provide exceptionally good corrosion protection to the underlying substrate. Water based coating compositions according to the invention can be employed in spray application techniques. Thus, for example, they can be employed as a spray-applied primer coat for automotive vehicle body panels.

According to one embodiment, coating compositions of the invention can be applied to the surface of a substrate by electrodeposition techniques. According to this embodiment, the self-crosslinkable coating composition, as described above, is at least partially, and preferably substantially totally neutralized with solubilizing acid and thereafter dispersed into deionized water or water/organic solvent mixture to a concentration of about 5-25 weight percent, more preferably about 10-15 weight percent. The resulting water based composition can be used as a cathodic electrocoat composition. That is, the coating comprising the crosslinkable resin and crosslinking agent, catalysts etc., if any, will deposit upon the workpiece acting as the cathode according to known electrodeposition systems and techniques. For coating compositions adapted for cathodic electrodeposition, the diene functional aminoepoxy resin is preferably of number average molecular weight about 1000-9000, and the amine functional blocked dieneophile resin is preferably of number average molecular weight about 1000-9000.

Cathodic electrodeposition according to the present invention is done preferably at voltages of about 1-500 volts, more preferably about 200-400 volts. Subsequent to electrodeposition, the coating on the substrate is heated to above about 130° C., more preferably about 135°-180° C. for a time sufficient to effect the diene/dieneophile reaction and to drive off substantially the entire aqueous solvent content of the coating. In general, it will be within the ability of those skilled in the art to select suitable electrodeposition voltage and baking temperatures and like process parameters in view of the particular application involved.

Such aqueous solvent based coating compositions can comprise a mixture of water and water compatible solvent and diluents such as ethylene glycols and alkylated glycols, for example oxygenated solvents such as Cellosolves and carbitols and the like or a compatible mixture of any of them. For use as spray primers, for example, such water based coating compositions can be formulated with high levels of water, for example, greater than about 10%, such as about 30-50% by weight. Obviously, the particular time and temperatures necessary to effect curing of the coating will depend upon the particular resins employed in the coating compositions and will depend upon the thickness of the coating, the use of catalysts, and like parameters familiar to the skilled of the art.

The invention will be further understood by referring to the following detailed examples. It should be understood that these examples are presented by way of illustration and not by way of limitation. Unless otherwise specified, all references to "parts" are intended to mean parts by weight.

EXAMPLE I

This example illustrates the preparation of a monoprimary amine functional blocked dienophile. Accordingly, 3,6-endoxo-1,2,3,6-tetrahydrophathalic anhydride was first prepared by combining 68 g (1 mole) furan with 98 g (1 mole) maleic anhydride in 166 g methyl ethyl ketone. The initially clear solution was stirred at room temperature; a mild exotherm and the formation of a white solid was observed. After stirring at room temperature for 4-6 hours, the solid was isolated by filtration, washed with cold methyl ethyl ketone and dried. To form the monoprimary amine functional blocked dienophile, 166 g (1 mole) of 3,6-endoxo-1,2,3,6-tetrahydrophthalic anhydride was added to a solution of 170 g (1 mole) isophorone diamine in 300 g dimethoxy ethane (DME). During the initial addition, the anhydride dissolved in the reaction mixture and a slight exotherm was noted. Within 4-6 hours the precipitation of the monoprimary amine functional blocked dienophile occured resulting in the formation of a fine white, water soluble solid after a thorough rinse with DME.

EXAMPLE II

This example illustrates the preparation of a self-crosslinking diene/dieneophile aminoepoxy resin. Thus, 154 g (0.8 mole epoxide) Epon 828 (trademark, Shell Chemical Co.) was dissolved in 60 g 1:1 butyl Cellosolve: hexyl Cellosolve. Furfurylamine (22.3 g) was added and the reaction was heated to 60° C. Within about 0.5 hours an exotherm raised the temperature to 90° C. Heating was continued at 60° C. and 39 g of the amino maleamic acid of Example I was added and allowed to react with stirring at 60° C. for 3 hours. Heating was then discontinued and the reaction was allowed to continue for another 0.5 hours. The resin was then cooled to room temperature and stored.

EXAMPLE III

This example illustrates the preparation of a fully formulated cathodic electrocoat bath formulation. The preparation involves a two part process.

Part A—Mill Base Preparation
Materials:
  202 g self-crosslinking aminoepoxy resin of Example II
  52 g Aluminum Silicate
  15 g White Lead
  7.5 g Carbon Black
  48.0 g Cellosolve The above materials are combined and the pigments are dispersed to a Hegman Gage reading of greater than 7 by grinding with metal shot.

Part B—Dispersion/Bath preparation
  286 g Mill base (Part A)
  230 g self-crosslinking aminoepoxy resin of Example II
  16 g glacial acetic acid
  1200 g deionized water The above materials, except for the water, are mixed thoroughly together and heated to 50°-60° C. The water is then slowly added while mixing a dispersator. After all the water is added, the dispersion is cooled to room temperature and mixed overnight. The resulting electrocoat bath is filtered and electrodeposited on steel panels at 150°-180° C. for 30 minutes and afforded coatins showing good corrosion resistance (less than 1 mm adhesive loss in 72 hours for testing).

EXAMPLE IV

This example illustrates the preparation of a solvent based coating formulation.

Part A—Mill Base
  202 g self-crosslinking aminoepoxy resin of Example II
  52 g Aluminum Silicate
  15 g White Lead
  7.5 g Carbon Black
  48.0 g Cellosolve The above materials are combined and the pigments are dispersed to a Hegman Gage reading of greater than 7 by grinding with metal shot. The mill base is then incorporated into a coating formulation by mixing with:

Materials:
206 g mill base (Part A)
230 g self-crosslinking aminoepoxy resin of Example II
600 g 1:1 Methyl Amyl Ketone: Ethoxy Ethanyl The resulting formation, after thorough mixing, is filtered and sprayed on steel panels and baked at 150°-180° C. for 30 minutes. The resulting coatings have good corrosion resistance showing less than 1 mm adhesive loss after 240 hours of salt spray testing.

EXAMPLE V

This example illustrates the use of a straight chain aliphatic amine in the preparation of amine functional blocked dienophile. Thus, the procedure of Example I is repeated except that 116 g (1 mole) 1,6-hexane diamine is used in place of isophorone diamine. Within 4-6 hours the precipitation of the monoprimary amine functional blocked dienophile occured resulting in the formation of a fine white, water soluble solid after a thorough rinse with DME.

EXAMPLE VI

This example illustrates the use of an aromatic diamine in the preparation of the amine functional blocked dienophile. Thus, the procedure of Example I is repeated using 122 g (1 mole) 4.6 toluene diamine in place of isophorone diamine. Within 4-6 hours the precipitation of the monoprimary amine functional blocked dienophile occured resulting in the formation of a fine white, water soluble solid after a thorough rinse with DME.

EXAMPLE VII

This example illustrates the use of unsaturated lactones in the preparation of a monoprimary amine functional blocked dienophile. Thus, the procedure of Example I is repeated except that one mole (98 g) of α-angelicalactone (4-hydroxy-3-pentenoic acid γ-lactone) is used in place of maleic anhydride. Within 4-6 hours the precipitation of the monoprimary amine functional blocked dienophile occured resulting in the formation of a fine white, water soluble solid after a thorough rinse with DME.

In view of this disclosure, many modification of this invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a cathodic electrodeposition primer coating composition for shett steel and the like used in automotive vehicles, household appliances and the like, and other applications where the coating composition desirably has excellent storage stability and the cured coating desirably provides excellent humidity and solvent resistance to protect the substrate against corrosion, wear and the like.

I claim:

1. A substantially gel-free self-crosslinkable conjugated diene functional blocked dieneophile functional aminoepoxy resin of number average molecular weight about 1000-9000, comprising the reaction product of diepoxide with reactants comprising (a) amine functional diene chain extending reactant, and (b) amine functional blocked dieneophile chain extending reactant.

2. The self-crosslinkable resin of claim 1, wherein said diepoxide reactant for said aminoepoxy resin is selected from the group consisting of Bisphenol A-epichlorohydrin epoxy resin, Novolak epoxy resin, aliphatic epoxy resins and a compatible mixture of any of them.

3. The self-crosslinkable resin of claim 1, wherein said amine functional diene reactant consists essentially of di-secondary amine functional bis-diene.

4. The self-crosslinkable resin of claim 1, wherein said amine functional diene reactant consists essentially of mono-primary amine functional diene.

5. The self-crosslinkable resin of claim 4, wherein said amine functional diene reactant is selected from those of the general formula:

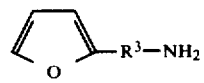

wherein $R^3$ is a divalent organic linking moiety containing no ester groups an no functionality substantially reactive with the diepoxide reactant.

6. The self-crosslinkable resin of claim 4, wherein said amine functional diene reaction is selected from the group consisting of furfuryl amine, 2-aminomethyl-1,3-butadiene, and a mixture thereof.

7. The self-crosslinkable resin of claim 1, wherein said amine functional blocked dieneophile reactant consists essentially of di-secondary amine functional bis-blocked dieneophile.

8. The self-crosslinkable resin of claim 1, wherein said amine functional blocked dieneophile reactant consists essentially of mono-primary amine functional blocked dieneophile.

9. The self-crosslinkable resin of claim 1, wherein said amine functional blocked dieneophile reactant consists essentially of mono-primary amine functional blocked ene.

10. The self-crosslinkable resin of claim 1, wherein said amine functional blocked dieneophile reactant comprises amino maleamic acid.

11. The self-crosslinkable resin of claim 1, wherein said amine functional blocked dieneophile reactant comprises the reaction product of diamine with 3,6-endoxo-1,2,3,6-tetrahydrophthalic anhydride.

12. The self-crosslinkable resin of claim 1, wherein said amine functional blocked dieneophile reactant comprises the reaction product of (i) diamine and (ii) conjugated diene blocking agent, with (iii) ene reactant selected from the group consisting of maleic anhydride, unsaturated lactone of the general formula:

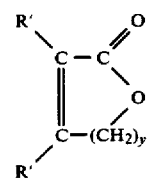

wherein each R' is selected independently from H, $C_1$-$C_5$ alkyl, and $C_1$-$C_5$ hydroxyalkyl, and y is from 1 to about 4, and a compatible mixture of any of them.

13. The self-crosslinkable resin of claim 12, wherein said diamine is selected from those of the general for- Materials:
206 g mill base (Part A)
230 g self-crosslinking aminoepoxy resin of Example II
600 g 1:1 Methyl Amyl Ketone: Ethoxy Ethanyl The resulting formation, after thorough mixing, is filtered and sprayed on steel panels and baked at 150°-180° C. for 30 minutes. The resulting coatings have good corrosion resistance showing less than 1 mm adhesive loss after 240 hours of salt spray testing.

EXAMPLE V

This example illustrates the use of a straight chain aliphatic amine in the preparation of amine functional blocked dienophile. Thus, the procedure of Example I is repeated except that 116 g (1 mole) 1,6-hexane diamine is used in place of isophorone diamine. Within 4–6 hours the precipitation of the monoprimary amine functional blocked dienophile occured resulting in the formation of a fine white, water soluble solid after a thorough rinse with DME.

EXAMPLE VI

This example illustrates the use of an aromatic diamine in the preparation of the amine functional blocked dienophile. Thus, the procedure of Example I is repeated using 122 g (1 mole) 4.6 toluene diamine in place of isophorone diamine. Within 4–6 hours the precipitation of the monoprimary amine functional blocked dienophile occured resulting in the formation of a fine white, water soluble solid after a thorough rinse with DME.

EXAMPLE VII

This example illustrates the use of unsaturated lactones in the preparation of a monoprimary amine functional blocked dienophile. Thus, the procedure of Example I is repeated except that one mole (98 g) of α-angelicalactone (4-hydroxy-3-pentenoic acid γ-lactone) is used in place of maleic anhydride. Within 4–6 hours the precipitation of the monoprimary amine functional blocked dienophile occured resulting in the formation of a fine white, water soluble solid after a thorough rinse with DME.

In view of this disclosure, many modification of this invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a cathodic electrodeposition primer coating composition for shett steel and the like used in automotive vehicles, household appliances and the like, and other applications where the coating composition desirably has excellent storage stability and the cured coating desirably provides excellent humidity and solvent resistance to protect the substrate against corrosion, wear and the like.

I claim:

1. A substantially gel-free self-crosslinkable conjugated diene functional blocked dieneophile functional aminoepoxy resin of number average molecular weight about 1000–9000, comprising the reaction product of diepoxide with reactants comprising (a) amine functional diene chain extending reactant, and (b) amine functional blocked dieneophile chain extending reactant.

2. The self-crosslinkable resin of claim 1, wherein said diepoxide reactant for said aminoepoxy resin is selected from the group consisting of Bisphenol A-epichlorohydrin epoxy resin, Novolak epoxy resin, aliphatic epoxy resins and a compatible mixture of any of them.

3. The self-crosslinkable resin of claim 1, wherein said amine functional diene reactant consists essentially of di-secondary amine functional bis-diene.

4. The self-crosslinkable resin of claim 1, wherein said amine functional diene reactant consists essentially of mono-primary amine functional diene.

5. The self-crosslinkable resin of claim 4, wherein said amine functional diene reactant is selected from those of the general formula:

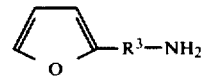

wherein $R^3$ is a divalent organic linking moiety containing no ester groups an no functionality substantially reactive with the diepoxide reactant.

6. The self-crosslinkable resin of claim 4, wherein said amine functional diene reaction is selected from the group consisting of furfuryl amine, 2-aminomethyl-1,3-butadiene, and a mixture thereof.

7. The self-crosslinkable resin of claim 1, wherein said amine functional blocked dieneophile reactant consists essentially of di-secondary amine functional bis-blocked dieneophile.

8. The self-crosslinkable resin of claim 1, wherein said amine functional blocked dieneophile reactant consists essentially of mono-primary amine functional blocked dieneophile.

9. The self-crosslinkable resin of claim 1, wherein said amine functional blocked dieneophile reactant consists essentially of mono-primary amine functional blocked ene.

10. The self-crosslinkable resin of claim 1, wherein said amine functional blocked dieneophile reactant comprises amino maleamic acid.

11. The self-crosslinkable resin of claim 1, wherein said amine functional blocked dieneophile reactant comprises the reaction product of diamine with 3,6-endoxo-1,2,3,6-tetrahydrophthalic anhydride.

12. The self-crosslinkable resin of claim 1, wherein said amine functional blocked dieneophile reactant comprises the reaction product of (i) diamine and (ii) conjugated diene blocking agent, with (iii) ene reactant selected from the group consisting of maleic anhydride, unsaturated lactone of the general formula:

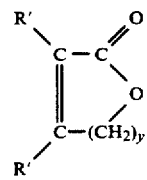

wherein each R' is selected independently from H, $C_1$-$C_5$ alkyl, and $C_1$-$C_5$ hydroxyalkyl, and y is from 1 to about 4, and a compatible mixture of any of them.

13. The self-crosslinkable resin of claim 12, wherein said diamine is selected from those of the general formula H₂N—R⁵—NH₂, wherein R⁵ is a divalent organic C₂–C₁₅ linking moiety which is substantially unreactive with said diepoxide, said ene reactant, and said diene blocking agent.

14. The self-crosslinkable resin of claim 13, wherein said diamine is selected from the group consisting of branched, straight, and cyclic aliphatic diamines, aromatic diamines, arylaliphatic diamines, and a compatible mixture of any of them.

15. The self-crosslinkable resin of claim 13, wherein said diamine is selected from the group consisting of isophorone diamine, 1,3-propanediamine, 1,4-butanediamine, 1,5-pentanediamine, 1,6-hexanediamine, 1,2-ethylenediamine, toluene diamine, and a compatible mixture of any of them.

16. The self-crosslinkable resin of claim 12, wherein said conjugated diene blocking agent is selected from the group consisting of conjugated aliphatic, cyclic aliphatic and heterocyclic aliphatic dienes and a mixture of any of them, wherein said diene is substantially unreactive with said diamine and with said ene reactant except at the ene functionality thereof.

17. The self-crosslinkable resin of claim 12, wherein said conjugated diene blocking agent is selected from the group consisting of furan, conjugated cycloalkyadiene, conjugated C₄–C₁₀ alkadiene, and a mixture of any of them.

18. The self-crosslinkable resin of claim 1, wherein said reactants further comprise a monofunctional end-capping reactant bearing a single functionality substantially reactive with epoxy functionality of said diepoxide reactant, and which is otherwise substantially unreactive with said diepoxide under end-capping reaction conditions.

19. The self-crosslinkable resin of claim 18, wherein said end-capping reactant is selected from the group consisting of mono-secondary amine functional blocked dieneophile, monohydroxy functional blocked dieneophile, mono-secondary amine functional diene, monohydroxy functional diene, and a mixture of any of them.

20. The self-crosslinkable resin of claim 19, wherein said end-capping reactant comprises the reaction product of conjugated diene blocking agent selected from the group consisting of furan, conjugated cycloalkadiene and a mixture of any of them, with monohydroxy functional dieneophile selected from the group consisting of hydroxypropyl methacrylate, methylol maleimide, and a mixture of any of them.

21. The self-crosslinkable resin of claim 18, wherein said monofunctional end-capping reactant is selected from the group consisting of furfuryl alcohol, 2-hydroxymethyl-1,3-butadiene, and a mixture thereof.

22. The self-crosslinkable resin of claim 1, further comprising crosslinking agent reactive with hydroxy functionality.

23. The self-crosslinkable resin of claim 22, wherein said crosslinking agent is selected from the group consisting of aminoplast crosslinking agents, poly-blocked isocyanate crosslinking agents, and a mixture of any of them.

24. A solvent based crosslinkable coating composition comprising:

A. substantially gel-free self-crosslinkable conjugated diene functional blocked dieneophile aminoepoxy resin of number average molecular weight about 1000–3000, comprising the reaction product of Bisphenol-A epichlorohydrin diepoxide resin with reactants comprising (a) amine functional diene chain extending reactant selected from the group consisting of furfuryl amine, 2-aminomethyl-1,3-butadiene, and any mixture thereof, (b) amine functional blocked dieneophile chain extending reactant comprising the reaction product of (i) diamine selected from the group consisting of isophorone diamine, 1,3-propanediane, 1,4-butanediamine, 1,5-pentanediamine, 1-6-hexanediamine, 1,2-ethylenediamine, toluene diamine and any mixture thereof, and (ii) conjugated diene blocking agent selected from the group consisting of furan, conjugated cycloalkadiene, conjugated C₄–C₁₀ alkadiene, and a mixture of any of them, with (iii) ene reactant selected from the group consisting of maleic anhydride, unsaturated lactone of the general formula:

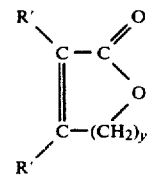

wherein each R' is selected independently from H, C₁–C₅ alkyl, C₁–C₅ hydroxyalkyl, and y is from 1 to about 4, and a compatible mixture of any of them, and (c) monofunctional end-capping reactant selected from the group consisting of (i) furfuryl alcohol, (ii) 2-hydroxymethyl-1,3-butadiene, (iii) the reaction product of conjugated diene blocking agent selected from the group consisting of furan, conjugated cycloalkadiene, conjugated C₄–C₁₀ alkadiene and a mixture of any of them, with monohydroxy functional dieneophile selected from the group consisting of hydroxypropyl methacrylate, methylol maleimide, and a mixture thereof, and (iv) a mixture of any of (i) - (iii); and B. organic solvent.

25. The solvent based crosslinkable composition of claim 24, further comprising crosslinking agent reactive with hydroxy functionality.

26. The solvent based crosslinkable composition of claim 25, wherein said crosslinking agent is selected from the group consisting of aminoplast crosslinking agent, polyblocked isocyanate crosslinking agent, and a mixture of any of them.

27. A crosslinkable composition of matter adapted for use in electrodeposition of coatings on a substrate, which composition comprises:

A. substantially gel-free self-crosslinkable conjugated diene functional blocked dieneophile functional aminoepoxy resin of number average molecular weight about 1000–9000, at least partially neutralized with solubilizing acid selected from the group consisting of acetic acid, lactic acid, formic acid, butyric acid, and a compatible mixture of any of them, comprising the reaction product of Bisphenol-A epichlorohydrin diepoxide resin with reactants comprising (a) amine functional diene chain extending reactant selected from the group consisting of furfuryl amine, 2-aminomethyl-1,3-butadiene, and any mixture thereof, (b) amine functional blocked dieneophile chain extending reactant comprising the reaction product of (i) diamine selected from the group consisting of isophorone diamine, 1,3-propanediane, 1,4-butanediamine, 1,5-pentanediamine, 1-6-hexanediamine, 1,2-ethylenedi-amine, toluene diamine and any mixture thereof, and (ii) conjugated diene blocking agent selected from the group consisting of furan, conjugated cycloalkadiene, conjugated $C_4$-$C_{10}$ alkadiene, and a mixture of any of them, with (iii) ene reactant selected from the group consisting of maleic anhydride, unsaturated lactone of the general formula:

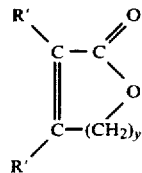

wherein each R' is selected independently from H, $C_1$-$C_5$ alkyl, $C_1$-$C_5$ hydroxyalkyl, and y is from 1 to about 4, and a compatible mixture of any of them, and (c) monofunctional end-capping reactant selected from the group consisting of (i) furfuryl alcohol, (ii) 2-hydroxymethyl-1,3-butadiene, (iii) the reaction product of conjugated diene blocking agent selected from the group consisting of furan, conjugated cycloalkadiene, conjugated $C_4$-$C_{10}$ alkadiene and a mixture of any of them, with monohydroxy functional dieneophile selected from the group consisting of hydroxypropyl methacrylate, methylol maleimide, and a mixture thereof, and (iv) mixture of any of (i)–(iii); and B. aqueous solvent, said at least partially neutralized diene functional blocked dieneophile functional aminoepoxy resin being dispersed in said aqueous solvent.

28. The crosslinkable composition of claim 27, further comprising crosslinking agent reactive with hydroxy functionality.

29. The crosslinkable composition of claim 27, wherein said crosslinking agent is selected from the group consisting of aminoplast crosslinking agents, poly-blocked isocyanate crosslinking agent, and a mixture thereof.

* * * * *